(12) United States Patent
Cohen et al.

(10) Patent No.: US 6,917,886 B2
(45) Date of Patent: Jul. 12, 2005

(54) MICROFLOW BASED DIFFERENTIAL PRESSURE SENSOR

(76) Inventors: Adam Cohen, 11 Cornell St., Worcester, MA (US) 01602; Josh Tang, 11 Longley Rd. #28, Shirley, MA (US) 01464

( * ) Notice: Subject to any disclaimer, the term of this patent is extended or adjusted under 35 U.S.C. 154(b) by 64 days.

(21) Appl. No.: 10/021,860

(22) Filed: Dec. 13, 2001

(65) Prior Publication Data

US 2002/0077759 A1 Jun. 20, 2002

Related U.S. Application Data

(63) Continuation-in-part of application No. 09/706,516, filed on Nov. 6, 2000, now Pat. No. 6,463,397.
(60) Provisional application No. 60/255,135, filed on Dec. 14, 2000.

(51) Int. Cl.[7] .............................. G01F 1/00; G01F 7/00; G06F 19/00
(52) U.S. Cl. ........................................................ 702/45
(58) Field of Search ........................ 73/204.26, 204.27, 73/861.42, 204.16, 1.3, 861.52, 1.34, 202.5; 702/45, 47; 126/116 A; 222/1; 600/505; 324/662

(56) References Cited

U.S. PATENT DOCUMENTS

| | | | | |
|---|---|---|---|---|
| 4,264,961 A | * | 4/1981 | Nishimura et al. ............ 702/47 |
| 4,562,731 A | * | 1/1986 | Nishimura et al. ......... 73/202.5 |
| 4,566,320 A | * | 1/1986 | Bohrer .................... 73/204.16 |
| 4,648,270 A | | 3/1987 | Johnson et al. |
| 4,719,806 A | * | 1/1988 | Craigen et al. .......... 73/861.42 |
| 4,959,990 A | | 10/1990 | Morris |
| 5,178,153 A | * | 1/1993 | Einzig ........................ 600/505 |
| 5,301,126 A | * | 4/1994 | Nishimura et al. ........... 702/45 |
| 5,311,762 A | * | 5/1994 | Drexel ....................... 73/1.34 |
| 5,535,633 A | * | 7/1996 | Kofoed et al. ........... 73/861.52 |
| 5,819,721 A | * | 10/1998 | Carr et al. ................ 126/116 A |
| 5,992,686 A | * | 11/1999 | Cline et al. ..................... 222/1 |
| 6,125,695 A | * | 10/2000 | Alvesteffer et al. ...... 73/204.27 |
| 6,220,080 B1 | * | 4/2001 | Fauque ....................... 324/662 |
| 6,588,268 B1 | * | 7/2003 | Yamagishi et al. ...... 73/204.26 |

\* cited by examiner

Primary Examiner—John Barlow
Assistant Examiner—Aditya Bhat
(74) Attorney, Agent, or Firm—Stroock & Stroock & Lavan LLP (57) ABSTRACT

A differential pressure sensor based on pressure induced micro-flow that includes two connecting hoses that are considered when the pressure sensor is calibrated. The inventive differential pressure sensor includes a flexible hose as part of the device itself, and is calibrated with the flexible hose in place (consequently, a usable hose length needs to be specified beforehand). Calibration constants for the air flow channel are determined and stored in non-volatile memory, and used to provide accurate pressure measurements. Thus, impedance in the air flow path introduced by the flexible hose is considered when the pressure sensor is calibrated. That insures that any measurement of air flow is not adversely effected by the introduction of an impedance in the air flow path previously not considered by the sensor. The present invention thus provides a self-contained differential pressure sensing device suitable for detecting changes in pressure for applications where a small amount of leakage is acceptable.

24 Claims, 3 Drawing Sheets

MICROFLOW BASED DIFFERENTIAL PRESSURE SENSOR

CROSS-REFERENCE TO RELATED APPLICATIONS

This application claims priority from U.S. Provisional Patent Application Ser. No. 60/255,135, filed on Dec. 14, 2000, and is a continuation-in-part of U.S. patent application Ser. No. 09/706,516 filed on Nov. 6, 2000, now U.S. Pat. No. 6,463,397.

FIELD OF THE INVENTION

The present invention is directed to a differential pressure sensor.

BACKGROUND OF THE INVENTION

Monitoring and control of air flow in a ventilation system may be accomplished by creating a differential pressure signal based on volumetric flow rate. There are several industry standard techniques that include a Venturi, orifice plate, flow nozzle and a laminar flow channel. Once a differential pressure is created, a differential pressure sensor can be used to determine the volumetric flow rate.

Standard differential pressure sensors function by translating a pressure effect into a different effect that can be measured by standard means. Some of these other effects include changes in displacement, capacitance and resistance of a material. For example, a membrane-type sensor such as a piezoresistive sensor, changes its resistance in response to changes in pressure on a piezoresistive element. Such a sensor may be incorporated in a wheatstone bridge circuit that is well-suited to measure changes in resistance. Thus, a change in pressure may be detected as a change in resistance.

However, piezoresistive sensors have several shortcomings that are pronounced when applied to meet cost and size constraints of certain embedded applications. The reduction in size of a piezoresistive pressure sensor means a smaller area of the piezoresistive element. Since pressure equals force times area, a smaller area requires a greater pressure to generate the same force. Therefore, a smaller area will be displaced less than a larger area element when exposed to the same pressure. That translates into a reduction in the strain the piezoresistive element experiences as a function of pressure, which in turn translates into a reduction in signal strength. For a small area piezoresistive sensor having a small area piezoresistive element, changes in pressure may cause too small a deflection of the piezoresistive element change to be measurable.

Any sensor is useful only if the quantity being measured has a reasonable signal-to-noise ratio and produces a signal that can be differentiated from other quantities, such as changes in temperature, sensor orientation, humidity and material aging, to name a few, that can also effect the sensor signal. This is why the signal output cannot be continuously amplified to achieve any level of performance.

While low cost piezoresistive sensors are suitable for measuring large pressure and pressure differences, their performance suffers at low pressures (e.g., less than 1-inch water column). The effect on the sensor element due to pressure starts to compare with the effects due to other factors such as temperature, internal heating, material aging, mechanical stresses due to mounting, and stresses due to the different coefficient of expansions for the different materials that make up the sensor. All of these effects are difficult to account for when calibrating a pressure sensor. However, for pressure sensors used to detect small changes or differences in pressure, accurate calibration is critically important. Thus, piezoresistive elements may not be suitable as pressure sensors for certain embedded applications which require detection of small changes or differences in pressure.

It is thus desirable to provide a pressure sensor that overcomes the above-described shortcomings of the prior art.

SUMMARY OF THE INVENTION

The present invention is directed to a differential pressure sensor that uses airflow as the measurable quantity that is created by a differential pressure. Although this method overcomes many of the short comings of the industry standard above mentioned techniques, it introduces a new short coming, namely, that it depends on the hose characteristics that typically connect the two pressure ports. The inventive differential pressure sensor includes one or two flexible hoses as part of the device itself, and is calibrated with the flexible hose in place. Calibration constants for the air flow channel are determined and stored in non-volatile memory, and used to provide accurate pressure measurements. Thus, impedance in the air flow path introduced by the flexible hose is considered when the pressure sensor is calibrated. That insures that any measurement of air flow is not adversely effected by the introduction of an impedance in the air flow path previously not considered by the sensor. The present invention thus provides a self-contained differential pressure sensing device suitable for detecting changes in pressure for virtually any differential pressure application in which detection of the volumetric, flow of a fluid is desired.

The differential pressure sensor of the present invention uses air flow as a measure of differential pressure and is based on the fact that a differential pressure will force air through an air flow channel. The rate of air flow through the air flow channel depends on the differential pressure divided by the total airflow resistance.

Two thermistor beads, embedded in the air flow channel, are used to measure the velocity of the airflow. Hot wire anemometry is a well known technique for measuring air speed (or velocity). The basic principle of a hot wire anemometer is to supply energy to an element (in this case a thermistor bead) that is positioned in an air stream or air flow path and to maintain the element (thermistor) at a known temperature above ambient (also referred to as constant temperature mode). At equilibrium, the energy being supplied to the element (thermistor) is equal to the energy being removed by the passage of air (or other fluid) over the element (thermistor). The amount of energy that is removed follows King's Law, an equation with empirically determined constants (see, e.g., Equation 1 herein). King's Law reduces the number of variables responsible for removing energy from the bead to two: air speed (or velocity) and temperature. If the temperature is known, King's Law can be used to determine the air speed as a function of the energy being imparted to the element (thermistor).

A first thermistor measures the temperature of the air in the air flow channel. A second thermistor, located downstream of the first thermistor, measures the heat removing capacity of the air flow through the channel. The second thermistor is operated in constant temperature mode whereby it is heated to and maintained at a constant temperature above ambient. Operation in that manner will also maintain the resistance of that thermistor at a constant, predetermined value. At thermal equilibrium, the amount of energy removed from the second thermistor by the air flow equals the amount of electrical energy imparted to it (by an electrical circuit, for example). Thus, as the velocity of the air flow through the channel changes, so too does the amount of energy required to maintain the second thermistor at the constant temperature.

The first thermistor is part of a voltage divider circuit that converts the resistance of that thermistor to a voltage, which is converted by an analog to digital (A/D) converter.

The second thermistor comprises one resistor in a wheatstone bridge circuit. An operational amplifier (op-amp) is coupled to the bridge circuit and keeps the bridge circuit balanced by continuously adjusting the voltage output of the op-amp in response to changes in the resistance value of the second thermistor. The output of the op-amp is thus an indication of the change in resistance of the second thermistor, which is an indication of the rate of air flow through the channel, which is an indication of the change in pressure in the channel.

Other circuitry may be coupled to the op-amp and bridge circuit. For example, another op-amp amplifies the signal from the op-amp and bridge circuit, and is connected to the A/D converter. Thus, the resistance values of both thermistors are expressed as voltage signals and provided to the A/D converter. A microcontroller is connected to the A/D converter and to non-volatile memory that has certain performance characteristics of the differential pressure sensor of the present invention stored therein. The microcontroller performs several functions including reading the digital signal from the A/D converter representing the resistance values of the two thermistors. The microcontroller also reads calibration constants from non-volatile memory, and it performs a mathematical equation that determines the differential pressure as a function of the two thermistor voltages. That differential pressure may be displayed or used to control air flow systems, as two illustrative examples.

The differential pressure sensor of the present invention may be used in any application for which a measurement of the volumetric flow of a fluid is desired. For example, the pressure sensor may be provided as part of a supply air system, and/or as party of an exhaust air system, for an animal containment rack.

The present invention thus provides certain advantages over prior art pressure sensors and methods. For example, the differential pressure sensor of the present invention can accurately measure small differential pressures at a fraction of the cost and size of other pressure sensors. Furthermore, since its principle of operation is not based on movement or stress of a membrane, it is insensitive to mechanical stresses caused by material aging or changes in temperature. The present invention is comprised of highly stable materials and therefore does not require re-calibration as often as other methods and devices. The differential pressure sensor of the present invention is also insensitive to gravity due to the use of bead thermistors to detect changes in pressure. Moreover, the bead thermistors used by the sensor of the present invention are small (14 milli-inch diameter, for example) and have thin lead wires (1 milli-inch) to connect the thermistor beads to an electronic device or circuit. Consequently, the differential pressure sensor of the present invention may be small. The use of bead thermistors to detect changes in pressure also provides a stable differential pressure sensor that is not susceptible to long term drift due to the inherent stability of thermistors or hot wires. Furthermore, bead thermistors provide for easy and accurate accountability for temperature effects in a pressure sensing device. Finally, the differential pressure sensor of the present invention does not depend on different thermal properties of materials to accurately sense changes in pressure. The foregoing list of advantages is merely illustrative, and not intended to limit or otherwise define the scope or spirit of the present invention.

The present invention accordingly comprises the features of construction, combination of elements, arrangement of parts, which will be exemplified in the disclosure herein, and the scope of the present invention will be indicated in the claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

Figure 2:
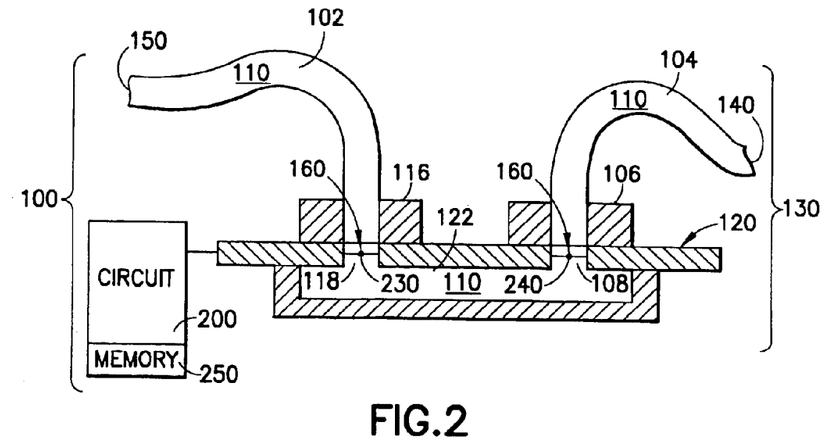
FIG. 2 is a cross-sectional side view of a differential pressure sensor constructed in accordance with an embodiment of the present invention.

Referring now to the drawings in detail, and with reference first to FIG. 2, a differential pressure sensor constructed in accordance with an embodiment of the present invention is there depicted and referred to generally by reference character 100. While the detailed description of the present invention is primarily directed to air flow, the present invention is applicable to any type of fluid. Thus, a description of the present invention with regard to air flow is provided as an illustrative embodiment, and is not intended to define or otherwise limit the scope or spirit of the present invention. The pressure sensor 100 may be connected via an input 140 and an output 150 to another system, apparatus, etc. across which a pressure measurement may be taken.

The differential pressure sensor 100 includes a fluid channeling device 130 having a fluid channel 110 defined therethrough. The fluid channeling device 130 comprises a fluid container 120 having an input aperture 108 and an output aperture 118 and a cavity 122 which defines a part of the fluid channel 110. The fluid channeling device 130 further comprises an input hose 104 coupled to the input aperture 108 by an input coupler 106, and an output hose 102 coupled to the output aperture 118 by an output coupler 116. Each of the input and output hose 104, 102 define a part of the fluid channel 110 and respectively comprise part of the input 140 and output 150 of the pressure sensor 100. A fluid may be caused to flow through the sensor 100 along the fluid channel 110 in a direction generally moving from the input 140 to the output 150 when the pressure of the fluid at the input 140 is different from the pressure of the fluid at the output 150. Fluid flow in the opposite direction is also possible, however the accuracy of the device is optimized if the flow is in the same direction as it was during calibration. The rate of air flow through the channel 110 depends on the differential pressure divided by the total air flow resistance. The sensor 100 itself need only consist of non-volatile memory 250, and first and second fluid flow detectors 240 and 230, as discussed in more detail below.

The differential pressure sensor 100 further comprises a fluid flow detector 160 provided in the fluid channel 110. The fluid flow detector 160 preferably comprises a first fluid flow detector 240 provided near the input 140 of the fluid channeling device 130, and a second fluid flow detector 230 provided near the output 150 of the fluid channeling device 130. Flow detector 230 is heated to a constant temperature above ambient and operated in what is typically referred to as constant temperature mode. In that mode, the temperature of flow detector 230 is maintained at a constant temperature, as discussed in more detail below. In a preferred embodiment, and as depicted in FIG. 2, the first fluid flow detector 240 is a bead thermistor operated as a hot wire anemometer and located in the input aperture 108, and the second fluid flow detector 230 is a bead thermistor operated as a hot wire anemometer and located in the output aperture 118. Flow detector 230 is preferably positioned "downstream" (in the air flow direction through the channel 110) of flow detector 240 so as not to disturb the temperature reading of flow detector 240.

The differential pressure sensor 100 of the present invention further comprises a circuit 200 coupled to the fluid flow detector 160 for detecting a change in fluid flow through the fluid channel 110. Preferably, the fluid flow detector 160 detects a change in pressure of a fluid flowing through the pressure sensor 100. The circuit 200 may be coupled to other circuitry to provide intelligence and input/output features and functionality. A preferred embodiment of the circuit 200 is depicted in FIG. 1 and will be discussed in detail below.

Figure 1:
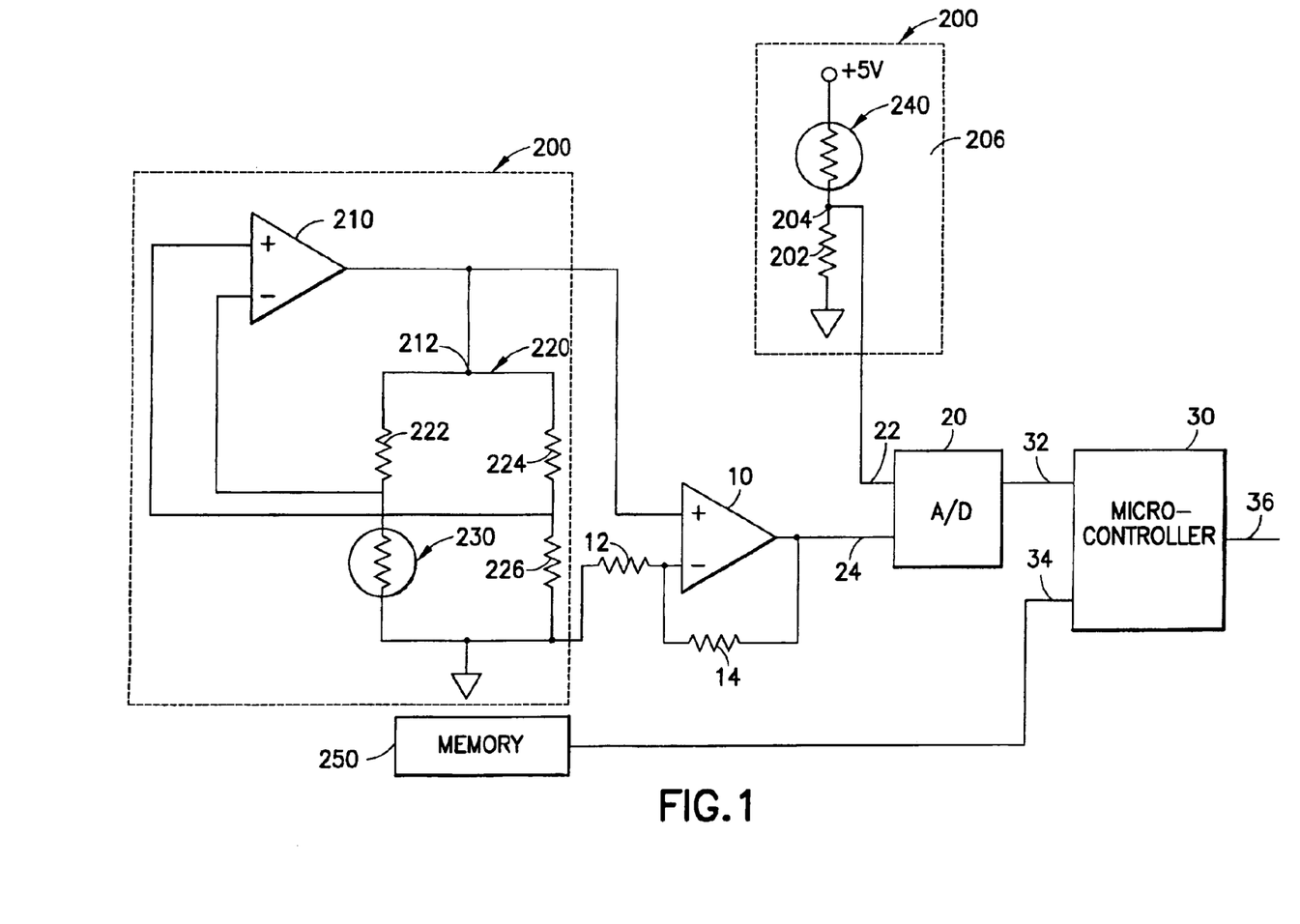
FIG. 1 is a schematic diagram of a differential pressure monitoring circuit constructed in accordance with an embodiment of the present invention.

Constant temperature mode operation of flow detector 230 is accomplished by configuring the flow detector 230 in a wheatstone bridge circuit 220 driven by the output of an op-amp 210, such as in the exemplary circuit 200 depicted in FIG. 1. The circuit 200 is designed to keep flow detector 230 at a constant resistance value, and thus at a constant temperature. It does this in the following way: in a steady state condition, the ratio of resistors 222/230 and resistors 224/226 is equal and the wheatstone bridge circuit 220 is balanced. The rate of energy being delivered to the flow detector 230 (electrically) is exactly equal to the rate of energy being removed from the flow detector 230 by air moving through the channel 110 and cooling the flow detector 230. A cooling of the flow detector 230 results in an increase in the thermistor's resistance, which in turn creates an imbalance in the wheatstone bridge circuit 220. The op-amp 210 will rebalance the wheatstone bridge circuit 220 by increasing the voltage output of the op-amp 210 and at node 212. That results in an increase in the amount of electrical energy being delivered to the flow detector 230. The voltage output of the op-amp 210 increases until the wheatstone bridge circuit 220 is re-balanced. The voltage signal output from the op-amp 210 is thus a measure of the velocity of the air flow.

The circuit 200 includes a wheatstone bridge circuit 220 having four resistors 222, 224, 226 and 230, one of which is the second fluid flow detector 230 depicted in FIG. 2. An operational amplifier (op-amp) 210 is connected to the bridge circuit 220 and maintains a balanced bridge circuit 220 by continuously adjusting its output in response to changes in the resistance of the second fluid flow detector 230. In a steady state condition, the wheatstone bridge circuit 220 is balanced; that is, the ratio of resistors 222/230 is equal to the ratio of resistors 224/226. If that ratio changes for example, if the resistance of flow detector 230 changes, the bridge circuit 220 becomes unbalanced and the voltage output of the op-amp 210 will change (increase or decrease depending on whether the resistance of flow detector 230 increase or decreases) to rebalance the bridge circuit 220.

Using King's Law, changes in the value of the resistance of flow detector 230 represent changes in the rate of flow of the fluid flowing through the air flow channel 110. According to King's Law, the rate of energy being delivered electrically to the flow detector 230 is exactly equal to the rate of energy being removed from the flow detector 230 by air passing over the flow detector 230 as air moves through the channel 110. When the flow detector 230 experiences an increase in air flow, there is a corresponding increase in the amount of energy removed from the flow detector 230. That results in an increase in the resistance of the flow detector 230, which in turn creates an imbalance in the wheatstone bridge circuit 220. The op-amp 210 will rebalance the wheatstone bridge circuit 220 by increasing the voltage output of the op-amp 210, provided to the bridge circuit 220 at node 212, thus increasing the amount of electrical energy being delivered to the flow detector 230. The net result is that the flow detector 230 is always kept at a constant temperature regardless of changes in air flow. The voltage output of the op-amp 210 is thus a measure of the energy being supplied to the flow detector 230, which is related to air speed by King's Law.

During use, flow detector 230 measures the speed of air flow through the air flow channel 110 utilizing hot wire anemometry. Flow detector 230 is heated to a predetermined temperature such as, for example, 120° C. For a given thermistor, the amount of energy required to maintain that thermistor at 120° C. is known. As the air flow flows through the air flow channel 110, the air will tend to cool the flow detector 230. This will require an increase in energy to maintain the temperature of the flow detector 230 at 120° C. (operating flow detector 230 in constant temperature mode). By measuring the increased energy required to maintain the temperature of the flow detector 230 at the desired temperature, the cooling effect of the air flow can be determined. As a result of the application of King's Law (see, e.g., equation (1) above), the air flow rate, and in turn, the volumetric flow rate or air through the air flow channel 110, can be determined. According to King's Law, energy provided to the thermistor bead (flow detector 230) equals $V^2/R$, where V is the voltage across the flow detector 230 and R is its resistance. Energy removed from the flow detector 230 equals the sum of the conduction loss, convection loss, and radiation loss (which is often negligible). Thus, the energy delivered electrically to the flow detector 230 equals:

$$K_1 * R^{q} * (T_{bead} - T_{ambient}) + K_2 * (T_{bead} - T_{ambient}) \quad (1)$$

Where:
$K_1$, is an empirically determined constant;
$K_2$ is an empirically determined constant;
q is an empirically determined constant (0.5<q<2.5);
$T_{ambient}$ is the ambient temperature;
$T_{bead}$ is the thermistor (flow detector 230) temperature; and
R is mass flow.
The energy delivered to the thermistor equals:

$$V^2/R_{bead} \quad (2)$$

where V is the voltage across flow detector 230 and $R_{bead}$ is its resistance value. Combining equations (1) and (2) yields:

$$V^2/R_{bead} = K_1 R^{q} * (T_{bead} - T_{ambient}) + K_2 * (T_{bead} - T_{ambient}) \quad (3)$$

which yields:

$$R^q = K_1'^* V^2 / (R_{bead}^*(T_{bead} - T_{ambient})) + K_2' \tag{4}$$

The output of the op-amp 210 is also connected to the positive input of op-amp 10, which amplifies the signal from the op-amp 210. Op-amp 10 amplifies and level shifts the output of op-amp 210 to match the dynamic range of analog-to-digital (A/D) converter 20. The output of op-amp 10 is an amplified analog voltage representative of changes in the air speed through the air flow channel 110 and is connected to input 24 of A/D converter 20.

The circuit 200 provided as part of the present invention also includes a voltage divider circuit 206 which includes the first fluid flow detector 240 connected in series between a 5 VDC source and a resistor 202. The voltage divider circuit 206 converts changes in the resistance of flow detector 240 to a voltage, which is output to input 22 of the A/D converter 20. A/D converter 20 provides a digital output based on the change in the resistance values of flow detectors 230 and 240, which represent changes in speed of air flow through and changes in pressure of air within the air flow channel 110.

The inventive differential pressure sensor 100 also includes non-volatile memory 250 having stored therein a plurality of data characteristics of the differential pressure sensor 100. Calibration data specific to a particular pressure sensor 100 may be stored in memory 250 during a calibration process (described in more detail below). For example, constants $K_1$, and $K_2$ (of equation 1, above) for a particular flow sensor 100 may be stored in memory 250. Values for those constants are determined and acquired during calibration of the differential pressure sensor 100 of the present invention, as described in more detail herein. Non-volatile memory 250 preferably contains all the calibration information of the flow and fluid properties if a particular pressure sensor 100 between input 140 and output 150.

A microcontroller 30 is connected to the A/D converter 20 and to memory 250. The microcontroller 30 performs several functions including reading the digital signal from the A/D converter 20 representing the resistance values of the two flow detectors 230, 240. The microcontroller 30 also reads calibration constants (for example, $K_1$, and $K_2$) from memory 250, and it performs King's Law equations to determine the differential pressure as a function of the two flow detector 230, 240 voltages present on inputs 22, 24 of the A/D converter 20. The microcontroller 30 may provide an output 36 based on the results of the mathematical equation that may be used to control another device such as, for example, a visual display or a supply and/or exhaust air system. It will be obvious to persons skilled in the art and from the disclosure provided herein the that microcontroller 30 may provide one or more output signals to control one or more other devices, systems, apparatus, etc., as a routine matter of design choice.

As used herein, the term microcontroller is used broadly to refer to a microprocessor integrated on a single chip intended to operate as an embedded system. A microcontroller typically contains all the components comprising a controller, including, by way of non-limiting example, a central processing unit (CPU), memory (e.g., RAM, ROM, etc.), computer code (typically, machine language computer code), and input/output ports.

As noted above, it is imperative that the impedance of the differential pressure sensor 100 be known. Due to manufacturing variations for the thermistor beads, flexible hoses, and other components of the sensor 100, each sensor 100 will perform differently and have different characteristics such as, for example, impedance and constants $K_1$, and $K_2$. Thus, in accordance with an aspect of the present invention, each differential pressure sensor 100 is individually calibrated to determine certain performance characteristics and to store values for those characteristics in non-volatile memory 250. The calibration process accounts for variations in many of the components that comprise the sensor 100. These include, by way of non-limiting example, the shape, size and temperature/resistance relationship of the fluid detector 230 (heated thermistor sensor), the dimensions of the air flow channel 110, the length and size of the connecting hoses 104, 102, and the position of the thermistors in the air stream.

Figure 3:
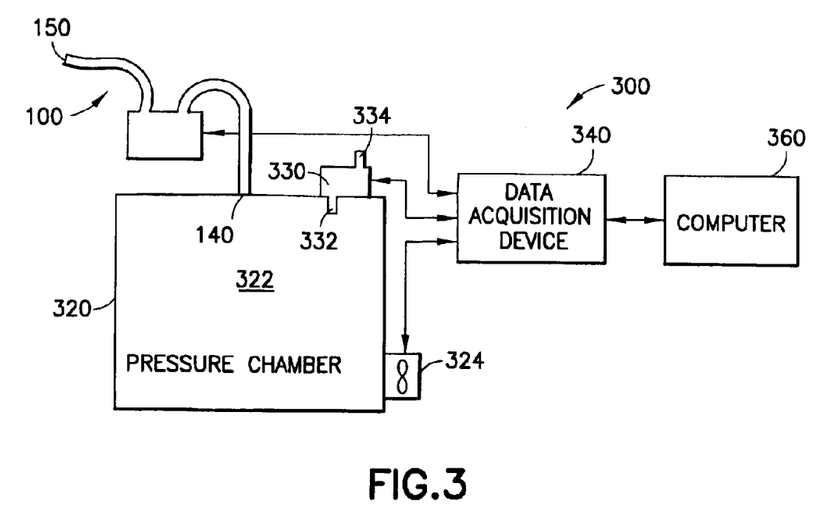
FIG. 3 is a functional schematic diagram of a system for calibrating a differential pressure sensor constructed in accordance with an embodiment of the present invention.

Referring next to FIG. 3, a system for calibrating the pressure sensor 100 of the present invention will now be discussed. The calibrating system, generally designated by reference character 300, includes a pressure enclosure 320 having a pressure chamber 322. Control of pressure within the chamber 322 is by a computer 360 electrically coupled to a data acquisition device 340, which is electrically coupled to each of a pressurizing device 324 such as, for example a fan, pressure sensor 330, and a differential pressure sensor 100 to be calibrated. The pressure sensor 330 has a first port 332 fluidly coupled to the chamber 322, and a second port 334 fluidly coupled to the ambient environment external to the chamber 322. Characteristics of the pressure sensor 330 are known. For example, for a given pressure, pressure sensor 330 will generate an electrical signal having a predetermined value. It is thus possible to sense and control the pressure within the chamber 322 using pressure sensor 330, pressurizing device 324 and the computer 360. A differential pressure sensor 100 to be calibrated is fluidly coupled to the chamber 322 via input port 140. Output port 150 is fluidly coupled to the ambient environment external to the chamber 322. Thus, the sensor 100 to be calibrated will experience the same pressure differential (pressure within and external to the chamber 322) as does the pressure sensor 330. For a given pressure within the chamber 322, the performance of the differential pressure sensor 100 to be calibrated can be measured and recorded by the computer 360. The computer 360 controls the calibration process, which is iterative, and measures and records a plurality of data for each pressure sensor 100 to be calibrated. Upon completion of the iterative calibration process, the plurality of data for each pressure sensor 100 are processed by the computer 360 to derive constants $K_1$ and $K_2$ and stored in non-volatile memory 250. The process of calculating constants $K_1$ and $K_2$ involves two basic steps. The first involves a change in variables that configures King's law into a polynomial. The second involves a "least Square Fit" calculation on the data, resulting in constants $K_1$ and $K_2$ that give the "best fit" to the data.

The data acquisition device 340 performs several functions. First, it adjusts the pressure in the chamber 322 via the pressurizing device 324. Second, it measures the pressure in the chamber 322 via pressure sensor 330 and it also provides an electronic interface between the pressure sensor 100 to be calibrated and the computer 360. Third, it measures the voltage readings for the first and second flow detectors 230, 240 in the pressure sensor 100. The data acquisition device 340 may perform other functions, or a variation of the functions described, as a routine matter of design choice.

To calibrate a differential pressure sensor 100, the computer 360 controls the calibration system 300 so that an iterative process is performed. In general, the computer 360, via data acquisition device 340, controls the pressurizing device 324 so as to set the pressure in the chamber 322 to a plurality of different pressures. As noted above, the pressure sensor 330 can accurately sense the pressure within the chamber 322 and provides feedback to the computer via the data acquisition device 340. Once the pressure within the chamber 322 is set to a predetermined pressure, the differential pressure sensor 100 to be calibrated will also experience the same differential pressure as the pressure sensor 330. At each of the plurality of pressures in the chamber 322 set by the computer 360, the pressure sensor 100 will generate an output signal indicative of the respective response of each of the flow detectors 230, 240 to the pressure in the chamber 322. That output signal is stored by the computer 360. Upon completion of the iterative calibration process, a plurality of data is stored in the computer 360 indicative of the response of the differential pressure sensor 100 to the plurality of pressures set by the computer 360 in the pressure chamber 322. The computer 360 process that plurality of data to calculate constants $K_1$ and $K_2$ for the pressure sensor 100. Those calculated constants are stored in non-volatile memory 250 of the pressure sensor 100.

A standard least square fit calculation can be performed to determine the constants $K_1$ and $K_2$, provided the equation can be expressed by a polynomial. A first order polynomial (y=mx+b) can be obtained by combining variables as follows:

$$y=R^q \qquad (5)$$

$$x=V^2/(T_{bead}-T_{ambient}) \qquad (6)$$

Figure 4:
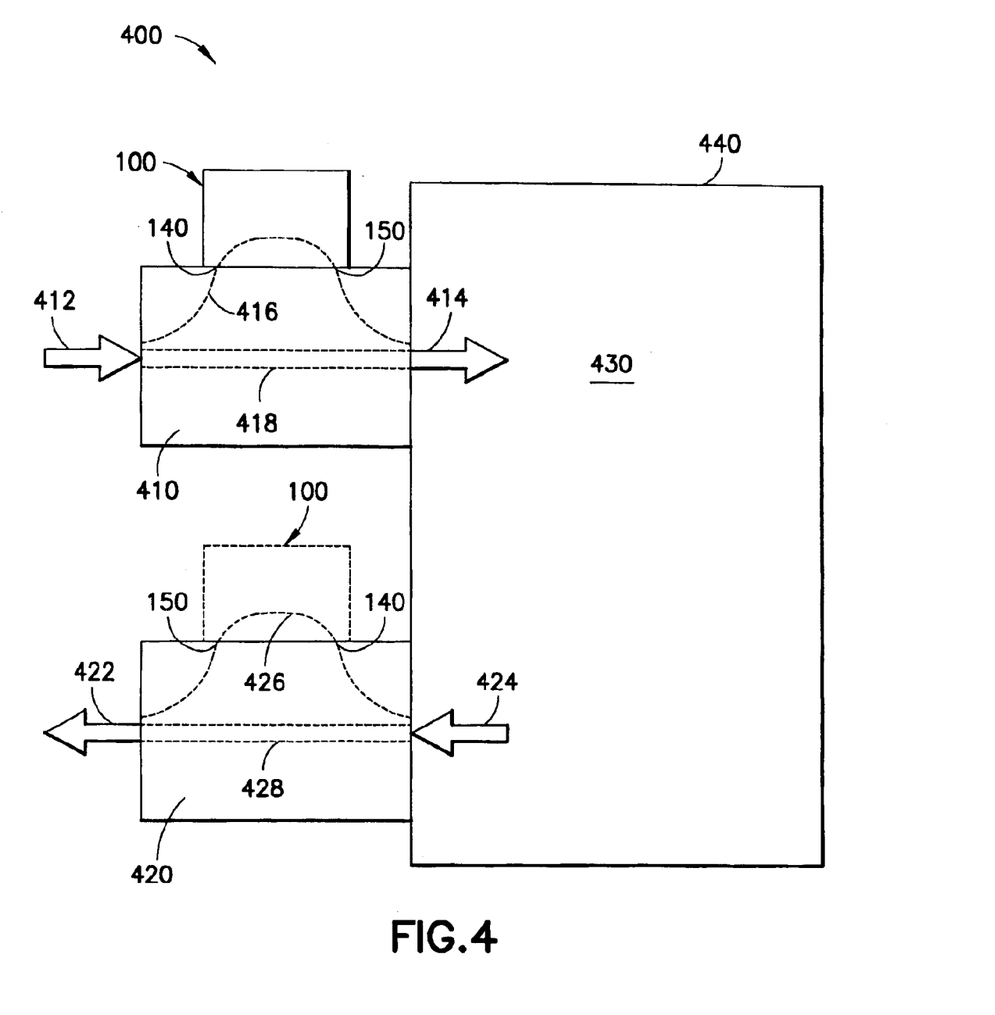
FIG. 4 is a schematic block diagram of a differential pressure sensor in accordance with an embodiment of the present invention coupled to a system within which pressure detection and/or control may be desired.

The differential pressure sensor 100 of the present invention may be connected to any apparatus, system, etc. though which a fluid may flow and within which it may be desirable to sense a characteristic of that fluid flow (e.g., air flow speed or velocity or change in pressure, by way of non-limiting examples). An exemplary system is depicted in FIG. 4 and generally designated by reference character 400. The system 400 includes an enclosure 440 having a chamber 430 defined therein. A supply air system 410 provides air flow into the chamber 430, and an exhaust air system 420 provides air flow out of the chamber 430. In an exemplary application of the system 400, a desired air flow or air exchange rate may be specified for the chamber 430 (changes per hour, for example). The supply air system 410 draws environmental air (air external to the chamber 430) in, as depicted by arrow 412. That air 412 may be filtered or otherwise processed with the supply air system 410 before passing as input air to the chamber 430, as indicated by arrow 414. The exhaust air system 420 draws air from the chamber 430, as indicated by arrow 424, filters or otherwise processes that air, and exhausts that air to the environment outside of the chamber 430, as indicated by arrow 420. For certain applications such as, for example, animal confinement racks and cages, it is desirable (and sometimes required) that the air flow through the system 400 and chamber 430 be maintained at a predetermined flow rate so that a predetermined number of air changes occur per unit time (e.g. per hour). Control of that air flow rate is by the supply air system 410 and exhaust air system 420. In that application, it is thus necessary for either or both of the supply and exhaust air systems 410, 420 to be able to sense the air flow rate through the system 400 and chamber 430. In a preferred embodiment, and as depicted in FIG. 4, the inventive pressure sensor 100 may be connected to the supply air system 410 so as to shunt part of the air flow 418 through the supply air system 410 through the pressure sensor 100, as indicated by arrow 416. Within the supply air system 410, two pressure regions are created using a Venturi, orifice plate, flow nozzle, or other known fluid flow control device. The input 140 of the pressure sensor 100 is coupled to a first pressure region, and the output 150 of the pressure sensor 100 is connected to a second, lower pressure region (when compared with the first pressure region). Using known fluid flow relationships and equations, it is possible to determine the volumetric flow of fluid (e.g., air) through the supply air system 410 by using the inventive differential pressure sensor 100 to sense the difference in pressure between the first and second pressure regions within the supply air system 410. The pressure sensor 100 may thus be used to control the supply air system 410 and control air flow in the enclosure 440.

A pressure sensor 100 may also be connected to the exhaust air system 420 so as to shunt part of the air flow 428 through the exhaust air system 420 through the pressure sensor 100, as indicated by arrow 426. As with the supply air system 410, two pressure regions are created with the exhaust air system 420, with the input 140 of the pressure sensor 100 being coupled to a first pressure region, and the output 150 of the pressure sensor 100 being connected to a second, lower pressure region (when compared with the first pressure region). In that embodiment, the supply air system 410 and exhaust air system 420 may operate in concert or independently to control the air flow through the chamber 430. The pressure sensor 100 may thus be used to control the supply air system 410 and exhaust air system 420 and control air flow in the enclosure 440.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A self contained differential pressure sensor capable of being coupled to an apparatus through which a fluid flows, said sensor comprising:

a fluid channeling device having a fluid channel defined therethrough and a fluid flow detector located in said fluid channel, said fluid channeling device further having a flexible input hose, a flexible output hose, and a fluid container having an input aperture to which said flexible input hose is coupled and an output aperture to which said flexible output hose is coupled;

a circuit coupled to said fluid flow detector for detecting a level of fluid flow through said fluid channel;

memory having stored therein a characteristic of said fluid channeling device, said characteristic comprising at least one fluid channel calibration constant, and wherein said characteristic of said fluid channeling device stored in said memory comprises calibration data related to the fluid impedance characteristics for said flexible input hose and said flexible output hose; and a microcontroller coupled to said fluid flow detector and said memory, said microcontroller being configured to determine a differential pressure value based on said level and on said characteristic;

wherein the differential pressure sensor is capable of being coupled to the apparatus via said flexible input hose and said flexible output hose.

2. A differential pressure sensor as recited by claim 1, wherein said fluid flow detector comprises:
   a first thermistor provided at a first location in said fluid channel; and
   a second thermistor provided at a second location in said fluid channel.

3. A differential pressure sensor as recited by claim 2, wherein a fluid flows through said fluid channel in a fluid flow direction, and wherein said second location is downstream from said first location in the fluid flow direction.

4. A differential pressure sensor as recited by claim 1, wherein said characteristic of said fluid channeling device comprises a first constant $K_1$ and a second constant $K_2$.

5. A differential pressure sensor as recited by claim 2, wherein said circuit comprises:
   a wheatstone bridge circuit having four resistors, one of which is said second thermistor; and
   a voltage divider circuit having two resistors, one of which is said first thermistor.

6. A differential pressure sensor as recited by claim 5, wherein said second thermistor is operated in constant temperature mode.

7. A differential pressure sensor as recited by claim 5, wherein said circuit further comprises an operational amplifier electrically coupled to said wheatstone bridge circuit to maintain said wheatstone bridge circuit in a balanced condition.

8. A method of calibrating a self contained differential pressure sensor comprising the steps of:
   (a) providing a calibration system having an enclosure with a pressure chamber and a controller for controlling a pressure with the pressure chamber;
   (b) coupling a pressure sensor to be calibrated to the calibration system and controller, said pressure sensor comprising a fluid channeling device that comprises a flexible input hose and a flexible output hose, said pressure sensor being coupled to said calibration system via said flexible input hose and said flexible output hose;
   (c) setting a pressure within the pressure chamber;
   (d) recording an a differential pressure output signal of the pressure sensor to be calibrated indicative of its response to the pressure set within the pressure chamber in step (c);
   (e) calculating a constant for the pressure sensor to be calibrated based on the output signal recorded in step (d); and
   (f) writing the constant in a memory of the pressure sensor to be calibrated, wherein a characteristic of said fluid channeling device stored in said memory comprises calibration data related to a fluid impedance characteristic of said flexible input hose and a fluid impedance characteristic of said flexible output hose.

9. A method as recited by claim 8, further comprising the step of repeating steps (c) through (e) for a predetermined number of iterations.

10. A system for controlling air flow in an enclosure having a chamber defined therein, said system comprising:
   a supply air system coupled to the chamber for providing air flow into the chamber; and
   a first differential pressure sensor coupled to said supply air system and comprising:
      an air channeling device having an air channel defined therethrough and a air flow detector located in said air channel, said air channeling device further having a flexible input hose, a flexible output hose, and a container having an input aperture to which said flexible input hose is coupled, and an output aperture to which said flexible output hose is coupled, said first differential pressure sensor being coupled to said supply air system via said flexible input hose and said flexible output hose;
   a circuit coupled to said air flow detector for detecting a level of air flow through said air channel; and
   memory having stored therein a characteristic of said air channeling device, said characteristic comprising at least one air channel calibration constant, and wherein said characteristic of said air channeling device stored in said memory comprises calibration data related to the fluid impedance characteristics for said flexible input hose and said flexible output hose;
   said first differential pressure sensor calculating a differential pressure and controlling said supply air system to maintain a predetermined air flow in the enclosure.

11. A system as recited by claim 10, wherein said air flow detector comprises:
   a first thermistor provided at a first location in said air channel; and
   a second thermistor provided at a second location in said air channel.

12. A system as recited by claim 11, wherein air flows through said air channel in an air flow direction, and wherein said second location is downstream from said first location in the air flow direction.

13. A system as recited by claim 10, wherein said characteristic of said air channeling device comprises a first constant $K_1$ and a second constant $K_2$.

14. A system as recited by claim 11, wherein said circuit comprises:
   a wheatstone bridge circuit having four resistors, one of which is said second thermistor; and
   a voltage divider circuit having two resistors, one of which is said first thermistor.

15. A system as recited by claim 14, wherein said second thermistor is operated in constant temperature mode.

16. A system as recited by claim 14, wherein said circuit further comprises an operational amplifier electrically coupled to said wheatstone bridge circuit to maintain said wheatstone bridge circuit in a balanced condition.

17. A system as recited by claim 10, further comprising an exhaust air system coupled to the chamber for providing air flow out of the chamber.

18. A system as recited by claim 17, further comprising:
   a second differential pressure sensor coupled to said exhaust air system and comprising:
      an air channeling device having an air channel defined therethrough and a air flow detector located in said air channel, said air channeling device further having a flexible input hose, a flexible output hose, and a container having an input aperture to which said flexible input hose is coupled, and an output aperture to which said flexible output hose is coupled, said second differential pressure sensor being coupled to said supply air system via said flexible input hose and said flexible output hose;
   a circuit coupled to said air flow detector for detecting a change in air flow through said air channel; and
   memory having stored therein a characteristic of said air channeling device, said characteristic comprising at least one air channel calibration constant, and wherein said characteristic of said air channeling device stored in said memory comprises calibration data related to the fluid impedance characteristics for said flexible input hose and said flexible output hose;

said second differential pressure sensor calculating a differential pressure and controlling said exhaust air system to maintain a predetermined air flow in the enclosure.

19. A system as recited by claim 18, wherein said air flow detector comprises:

a first thermistor provided at a first location in said air channel; and a second thermistor provided at a second location in said air channel.

20. A system as recited by claim 19, wherein air flows through said air channel in an air flow direction, and wherein said second location is downstream from said first location in the air flow direction.

21. A system as recited by claim 18, wherein said characteristic of said air channeling device comprises a first constant $K_1$ and a second constant $K_2$.

22. A system as recited by claim 19, wherein said circuit comprises:

a wheatstone bridge circuit having four resistors, one of which is said second thermistor; and a voltage divider circuit having two resistors, one of which is said first thermistor.

23. A system as recited by claim 22, wherein said second thermistor is operated in constant temperature mode.

24. A system as recited by claim 22, wherein said circuit further comprises an operational amplifier electrically coupled to said wheatstone bridge circuit to maintain said wheatstone bridge circuit in a balanced condition.

* * * * *